United States Patent
Chu et al.

(12) 
(10) Patent No.: US 10,177,384 B2
(45) Date of Patent: Jan. 8, 2019

(54) POSITIVE ACTIVE MATERIAL FOR RECHARGEABLE LITHIUM BATTERY, METHOD OF MANUFACTURING THE SAME AND RECHARGEABLE LITHIUM BATTERY USING THE SAME

(75) Inventors: Hee-Young Chu, Yongin-si (KR); Sung-Hwan Moon, Yongin-si (KR); Jae-Hyuk Kim, Yongin-si (KR); Myung-Hwan Jeong, Yongin-si (KR); Chang-Ui Jeong, Yongin-si (KR); Jong-Seo Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1325 days.

(21) Appl. No.: 13/348,606

(22) Filed: Jan. 11, 2012

(65) Prior Publication Data
US 2012/0183853 A1  Jul. 19, 2012

Related U.S. Application Data (60) Provisional application No. 61/432,562, filed on Jan. 13, 2011.

(51) Int. Cl.
*H01M 4/62* (2006.01)
*H01M 4/36* (2006.01)
*H01M 4/505* (2010.01)
*H01M 4/525* (2010.01)

(52) U.S. Cl.
CPC .......... *H01M 4/624* (2013.01); *H01M 4/364* (2013.01); *H01M 4/505* (2013.01); *H01M 4/525* (2013.01)

(58) Field of Classification Search
None
See application file for complete search history.

(56) References Cited

U.S. PATENT DOCUMENTS

| 6,808,845 B1 * | 10/2004 | Nonaka et al. ............... 429/213 |
| 2006/0159997 A1 * | 7/2006 | Sunagawa ........... H01M 4/0404 |
| | | 429/233 |

(Continued)

FOREIGN PATENT DOCUMENTS

| JP | 06-333562 | * 12/1994 | .............. H01M 4/58 |
| JP | 2009-64576 | 3/2009 | |

(Continued)

OTHER PUBLICATIONS

Li, et al., "Cathode materials modified by surface coating for lithium ion batteries", Electrochimica Acta 51 (2006), pp. 3872-3883.

(Continued)

*Primary Examiner* — Ula C Ruddock
*Assistant Examiner* — Amanda J Barrow
(74) *Attorney, Agent, or Firm* — Lewis Roca Rothgerber Christie LLP (57) ABSTRACT

A positive active material for a rechargeable lithium battery includes a positive active material compound including a metal compound for intercalating and deintercalating lithium, a coating particle having an embedded portion embedded into the active material compound and a protruding portion protruding from the surface of the active material, and a rechargeable lithium battery including the positive active material.

11 Claims, 9 Drawing Sheets

(56) References Cited

U.S. PATENT DOCUMENTS

| | | | | |
|---|---|---|---|---|
| 2006/0237697 | A1* | 10/2006 | Kosuzu | H01M 4/134 252/500 |
| 2008/0003503 | A1* | 1/2008 | Kawakami | H01G 9/155 429/231.5 |
| 2008/0116423 | A1* | 5/2008 | Fan | H01B 1/122 252/502 |
| 2009/0098033 | A1* | 4/2009 | Lian | B01J 13/02 423/213.5 |
| 2009/0246563 | A1* | 10/2009 | Reynolds | H01M 4/24 429/515 |
| 2009/0309063 | A1* | 12/2009 | Paulsen | C01G 45/1228 252/182.33 |
| 2010/0119947 | A1 | 5/2010 | Lee et al. | |
| 2010/0273048 | A1* | 10/2010 | Machida et al. | 429/188 |
| 2010/0310939 | A1* | 12/2010 | Yoshida | H01M 4/366 429/231.8 |
| 2013/0071744 | A1* | 3/2013 | Zhou et al. | 429/219 |
| 2013/0230774 | A1* | 9/2013 | Ortega et al. | 429/221 |

FOREIGN PATENT DOCUMENTS

| | | | |
|---|---|---|---|
| JP | 2009-064576 | 3/2009 | |
| JP | 2009-64732 | 3/2009 | |
| JP | 2009-064732 | 3/2009 | |
| JP | 2009-301749 | 12/2009 | |
| JP | 2010-251194 | * 11/2010 | H01M 4/58 |
| JP | 2010-251194 A | 11/2010 | |
| KR | 10-2006-0046546 | 5/2006 | |
| KR | 10-2007-0008115 | 1/2007 | |
| KR | 10-2010-0053758 | 5/2010 | |

OTHER PUBLICATIONS

Patent Abstracts of Japan and English machine translation of Japanese Publication 2009-064576 listed above, 28 pages.

Patent Abstracts of Japan and English machine translation of Japanese Publication 2009-064732 listed above, 24 pages.

Patent Abstracts of Japan and English machine translation of Japanese Publication 2009-301749 listed above, 26 pages.

Yang et al., "Influence of Temperature on Evolution of Coaxial $ZnO/Al_2O_3$ One-Dimensional Heterostructures: From Core-Shell Nanowires to Spinel Nanotubes and Porous Nanowires," J. Phys. Chem. C, vol. 112, Issue 11, 2008, pp. 4068-4074.

* cited by examiner

POSITIVE ACTIVE MATERIAL FOR RECHARGEABLE LITHIUM BATTERY, METHOD OF MANUFACTURING THE SAME AND RECHARGEABLE LITHIUM BATTERY USING THE SAME

CROSS-REFERENCE TO RELATED APPLICATION

This application claims priority to and the benefit of U.S. Provisional Application No. 61/432,562, filed in the United States Patent and Trademark Office on Jan. 13, 2011, the entire disclosure of which is incorporated herein by reference.

BACKGROUND

1. Field

This disclosure relates to a positive active material for a rechargeable lithium battery and a rechargeable lithium battery including the same.

2. Description of the Related Art

Recently, as a result of reductions in the size and weight of portable electronic equipment, there has been a need to develop batteries for use in smaller and lighter portable electronic equipment where the batteries have both high performance and a large capacity.

Batteries generate electric power using an electrochemical reaction material (referred to hereinafter simply as the "active material") for a positive electrode and an active material for a negative electrode. Rechargeable lithium batteries generate electrical energy from changes of chemical potential during the intercalation/deintercalation of lithium ions at the positive and negative electrodes.

Rechargeable lithium batteries use materials that reversibly intercalate or deintercalate lithium ions during charge and discharge reactions for both positive and negative active materials. Rechargeable lithium batteries may contain an organic electrolyte or a polymer electrolyte between the positive electrode and the negative electrode.

For positive active materials that can be in a rechargeable lithium battery, lithium composite metal compounds have been used, for example, lithium composite metal oxides such as $LiCoO_2$, $LiMn_2O_4$, $LiNiO_2$, $LiNi_{1-x}Co_xO_2$ (0<x<1), $LiMnO_2$, or the like have been researched.

Of the positive active materials, manganese-based positive active materials such as $LiMn_2O_4$ or $LiMnO_2$ are generally the easiest to synthesize, are less costly than the other materials, have better thermal stability than other active materials during overcharging, and are generally environmentally friendly. However, these manganese-based materials have relatively low capacity.

Among the commercially available positive active materials, $LiCoO_2$ is representative, as it has good electrical conductivity, a high battery voltage of about 3.7 V, good cycle-life characteristics, high stability, and good discharge capacity. However, as $LiCoO_2$ is expensive (e.g., it may be 30% or more of the total cost of a battery), it has disadvantages in terms of cost.

Also, $LiNiO_2$ has the highest discharge capacity characteristics among the above referred positive active materials, but it is difficult to synthesize. Further, the high oxidation states of nickel cause battery and electrode cycle-life deterioration. Batteries including $LiNiO_2$ often self-discharge and have lowered reversibility. Furthermore, it is difficult to fabricate commercially available batteries including $LiNiO_2$ as it is difficult to ensure stability.

SUMMARY

Aspects of embodiments of this disclosure are directed toward a positive active material that is economical, has stability, high-capacity, improved electrical conductivity, and high rate characteristics.

According to one embodiment of this disclosure, a positive active material for a rechargeable lithium battery includes an active material compound for intercalating and deintercalating lithium and a coating particle having an embedded portion embedded into the active material compound and a protruding portion protruding from the surface of the active material compound.

The active material compound may have a contact portion contacting the coating particle and a protruding portion at around the contact portion, the protruding portion being higher than the contact portion.

In one embodiment, the volume of the embedded portion is at 80 or 95 volume % or between 80 and 95 volume % of the total volume of the coating particle.

The ratio of the equivalent diameter of an equivalent spherical diameter of the protruding portion to an equivalent spherical diameter of the coating particle may be at 0.7 or 0.9 or between 0.7 and 0.9.

The coating particle may have an equivalent spherical diameter at 1.6 or 2.0 µm or between 1.6 and 2.0 µm.

The coating particle may be a compound selected from oxides, hydroxides, oxyhydroxides, oxycarbonates, hydroxycarbonates, and combinations thereof.

The coating particle may further include a metal selected from Li, B, C, Na, Mg, Al, Si, P, Ca, Sc, Ti, V, Cr, Mn, Fe, Co, Ni, Cu, Zn, Ga, Ge, As, Sr, Y, Zr, Nb, Mo, Sn, Ba, Hf, La, and combinations thereof.

In one embodiment, the weight of the coating particle with respect to the active material compound is 0.1 to 10 wt %.

According to another embodiment of this disclosure, a method for preparing the positive active material for a rechargeable lithium battery includes preparing a positive active material for intercalating and deintercalating lithium, mixing the active material compound with a coating particle to form an active material mixture, and heat treating the active material mixture at 85 to 95% or between 85 to 95% of the melting point in ° C. of the active material compound to form the positive active material.

According to aspects of embodiments of the present invention, the positive active material is economical, has good stability, high capacity, improved electrical conductivity, and high rate characteristics.

DETAILED DESCRIPTION

Embodiments of the present invention will hereinafter be described in more detail. However, these embodiments are only exemplary, and the present invention is not limited thereto.

According to one embodiment of the present invention, a positive active material for a rechargeable lithium battery includes a metal compound (i.e., an active material compound) that intercalates/deintercalates lithium. The positive active material further includes a coating particle (e.g., a metal oxide particle) on the surface of the positive active material. A part of the coating particle is inserted into (e.g., is in or embedded in) the positive active material to thereby form an embedded portion (e.g., an inserted portion) and another part of the coating particle protrudes from the surface of the positive active material to thereby form a protruding portion.

Referring to the Figures, one or more positive active materials for a rechargeable lithium battery according to one or more embodiments of the present invention are described.

Figure 1:
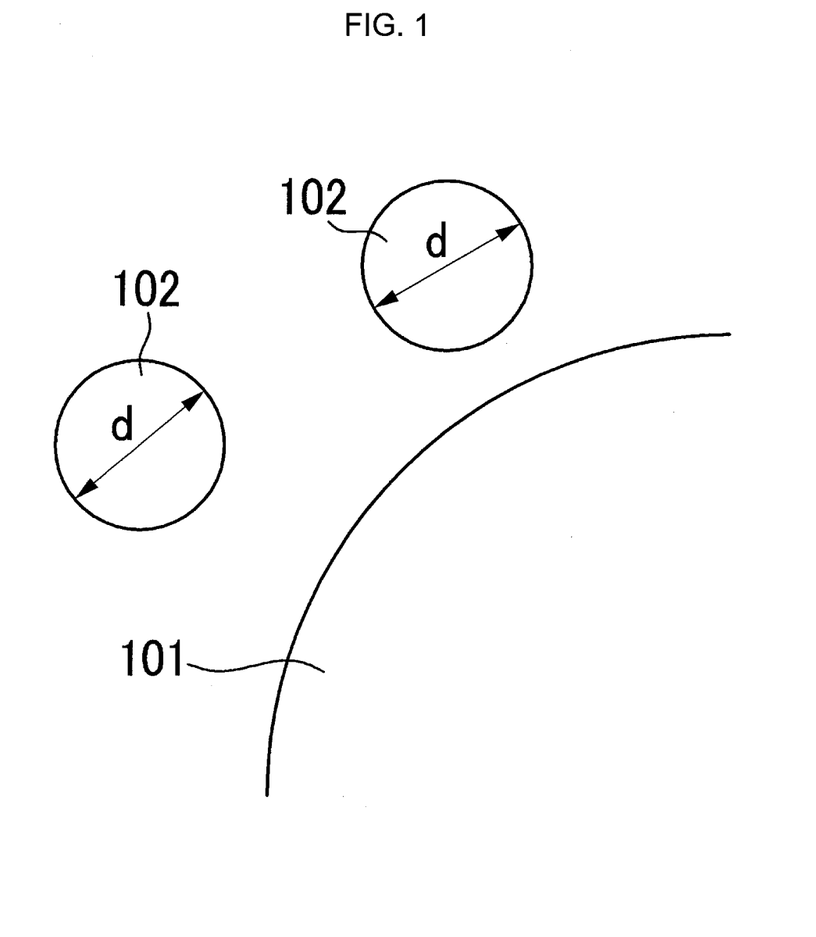
FIG. 1 is a schematic view of a positive active material before being coated with metal oxide.
Figure 2:
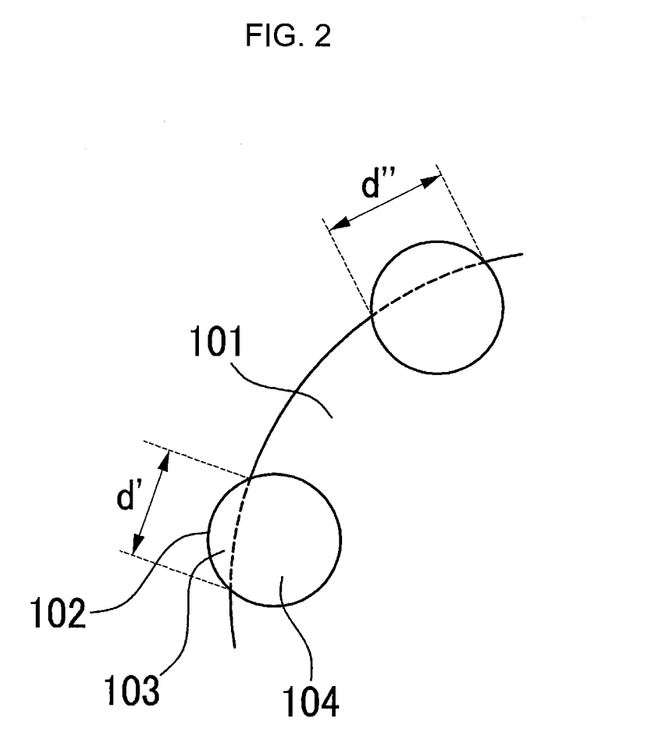
FIG. 2 is a schematic view of a positive active material including metal oxide coated on the surface thereof.

FIG. 1 is a schematic view of a positive active material 101 prior to coating metal oxide 102 onto the positive active material 101, and FIG. 2 is a schematic view of a positive active material 101 including metal oxide 102 coating the surface thereof.

As shown in FIG. 2, the metal oxide 102 coats the surface of the positive active material 101 so that a part of the metal oxide 102 is inserted into or embedded into the positive active material 101.

Herein, the part of the metal oxide 102 inserted or embedded in the positive active material 101 is referred to as an embedded portion 104, and the portion protruding from the surface of the metal oxide 102 is referred to as a protruding portion 103.

In FIGS. 1 and 2, the reference symbols d, d' and d" denote the equivalent diameter of the metal oxide. When a generally spherical particle is measured to determine its particle diameter, it is called a virtual equivalent diameter. When one of the physical characteristics of a measured particle is similar to that of a sphere, the diameter of the measured particle is referred to as an equivalent diameter. In short, as most particles are not generally spherical, but rather, share only some characteristics with a sphere, the diameter measured by a particle analyzer is an equivalent diameter in most situations. Here, it should be apparent that the virtual equivalent diameter is the measurement of a particle that is more spherical than a particle measured using equivalent diameter.

The metal oxide 102 coating the surface of the positive active material 101 may not exist on the entire surface of the positive active material 101. That is, the metal oxide 102 coating the surface of the positive active material 101 may only be present on a portion of the surface of the positive active material 101. This is to prevent or reduce the hindrance of lithium ions.

As described above, when the metal oxide 102 coats (e.g., partially coats) the positive active material 101, the contact area between the surface of the positive active material 101 and the metal oxide 102 increases substantially. Therefore, the structural stability of the positive active material may be increased due to the coating.

If the entire volume of the coating particle (e.g., a metal particle) is about 100 volume %, the volume of the embedded portion may range from about 80 to about 95 volume % with respect to the entire volume of the coating particle. According to one embodiment, the volume of the embedded portion may range from about 85 to about 95 volume %.

The ratio of the equivalent diameter of the protruding portion of the coating particle (e.g., a metal particle) to the equivalent diameter of the coating particle may range from about 0.7 to about 0.9. According to one embodiment, the ratio of the equivalent diameter of the protruding portion to the equivalent diameter of the coating particle may range from about 0.75 to about 0.85.

According to one embodiment, the equivalent diameter of the coating particle (e.g., a metal particle) may range from about 1.610 µm to about 2.010 µm (e.g., about 1.61 µm to about 2.01 µm). According to another embodiment, the equivalent diameter of the coating particle may range from about 1.710 µm to about 1.910 µm (e.g., about 1.71 µm to about 1.91 µm). In view of the above ratios, the equivalent diameter of the protruding portion may range from about 1.276 µm to about 1.676 µm (e.g., about 1.28 µm to about 1.68 µm).

Since the equivalent diameter of the protruding portion of the coating particle may not be measured with a particle analyzer, it is measured using a SEM photograph of the surface of the active material.

The above range signifies that the coating particle (e.g., a metal particle) coats the surface of the positive active material deep into the pores. When it is assumed that the average equivalent diameter of the coating particle after the coating is about 80% of the diameter of the particle and the coating particle has a spherical shape (and more of the particle is embedded in the active material than protrudes from the active material), 89.6 volume % of the coating particle is inserted or embedded into the surface of the positive active material.

An equation for obtaining the volume of the embedded part of the particle, i.e., from where the diameter of the sphere at the surface of the active material is at 80 to the bottom part of the sphere in a sphere having a diameter of 100 is as follows.

$$\int_0^{30} \pi(50^2-x^2)dx + \int_0^{50} \pi(50^2-x^2)dx \quad \text{[Equation 1]}$$

In Equation 1, x denotes a diameter of the sphere. When Equation 1 is calculated, the result is 89.6. This is an integral value, which denotes the volume ratio at a part where the diameter is 80. That is, when the average equivalent diameter of the coating particle after being coated onto the positive active material is about 80% of the diameter of the particle (as shown schematically in FIG. 2) and the particle has a spherical shape, 89.6 volume % of the coating particle is inserted or embedded into the positive active material.

When the above range is satisfied, the structural stability of the positive active material may be improved, and a rechargeable lithium battery manufactured using the positive active material may have increased cycle-life, capacity, and thermal stability without a substantial decrease in the initial capacity.

Figure 3:
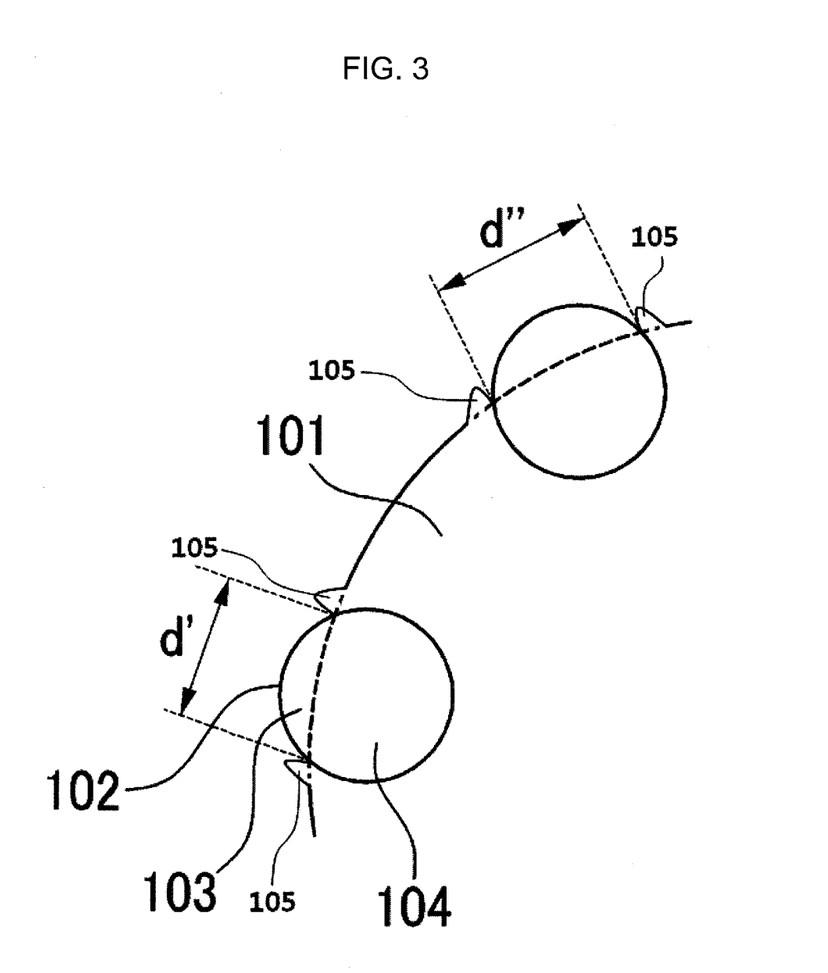
FIG. 3 is another schematic view of a positive active material including metal oxide coated on the surface thereof.

According to another embodiment, as shown in FIG. 3, the coating particle (e.g., a metal particle) 102 coats the surface of the positive active material 101 so that a part of the coating particle 102 is inserted or embedded into the positive active material 101. The part of the coating particle 102 inserted or embedded in the positive active material 101 is referred to as an embedded portion 104, and the portion protruding from the surface of the coating particle 102 is referred to as a protruding portion 103. The positive active material 101 has a contact portion contacting the coating particle 102 and a protruding portion 105 at around the contact portion. The contact portion is the portion where the coating particle 102 contacts the positive active material 101. The protruding portion 105 is higher than the contact portion (e.g., it extends further above the surface of the positive active material 101).

In one embodiment, the coating particle is a metal oxide that may include at least one or more coating element compound including an oxide of a coating element, a hydroxide of a coating element, an oxyhydroxide of a coating element, an oxycarbonate of a coating element, or an hydroxycarbonate of a coating element. The compound for a coating layer may be amorphous or crystalline. The coating element of the metal oxide may include Li, B, C, Na, Mg, Al, Si, P, Ca, Sc, Ti, V, Cr, Mn, Fe, Co, Ni, Cu, Zn, Ga, Ge, As, Sr, Y, Zr, Nb, Mo, Sn, Ba, Hf, La, or a mixture thereof.

The weight of the coating particle (e.g., the metal particle) with respect to the weight of active material compound is 0.1 to 10 wt %. That is, the coating particle is included at 0.1 to 10 wt % with respect to the weight of the active material compound.

The positive active material may be a metal compound that intercalates/deintercalates lithium includes at least one selected from $Li_aA_{1-b}X_bD_2$ ($0.90 \leq a \leq 1.8$, $0 \leq b \leq 0.5$); $Li_aA_{1-b}X_bO_{2-c}T_c$ ($0.90 \leq a \leq 1.8$, $0 \leq b \leq 0.5$, $0 \leq c \leq 0.05$); $LiE_{1-b}X_bO_{2-c}D_c$ ($0 \leq b \leq 0.5$, $0 \leq c \leq 0.05$); $LiE_{2-b}X_bO_{4-c}T_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG'_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMnG'_bPO_4$ ($0.90 \leq a \leq 1.8$, $0.001 \leq b \leq 0.1$); $LiNiVO_4$; or $Li_{(3-f)}J_2(PO_4)_3$ ($0 \leq f \leq 2$).

In the above formulae, A is selected from Ni, Co, Mn, or combinations thereof; X is selected from Al, Ni, Co, Mn, Cr, Fe, Mg, Sr, V, a rare earth element, or combinations thereof; D is selected from O, F, S, P, or combinations thereof; E is selected from Co, Mn, Ni, or combinations thereof; T is selected from F, S, P, or combinations thereof; G is selected from Ni, Al, Cr, Mn, Fe, Mg, La, Ce, Sr, V, or combinations thereof; G' is selected from Ni, Al, Cr, Fe, Mg, La, Ce, Sr, V, or combinations thereof; Q is selected from Ti, Mo, Mn, Ni, or combinations thereof; Z is selected from Cr, V, Fe, Sc, Y, Ni, or combinations thereof; and J is selected from V, Cr, Mn, Co, Ni, Cu, or combinations thereof.

According to another embodiment of this disclosure, a method for preparing a positive active material for a rechargeable lithium battery includes a) preparing a positive active material including a metal compound that intercalates/deintercalates lithium; b) preparing a mixture by mixing the positive active material and the metal oxide particle; and c) performing a heat treatment onto the mixture of step b), wherein the heat treatment is performed at a temperature of about 85 to about 95% of the melting point of the positive active material.

When the heat treatment is performed at a temperature of about 85 to about 95% of the melting point of the positive active material, the positive active material coated with the metal oxide embedded therein as described in embodiments of this disclosure may be prepared.

According to one embodiment, the melting point of $LiCoO_2$ is known to be 1130° C. and the temperature of the heat treatment may be about 1000° C., which is about 88% of the melting point. In an embodiment, the temperature may be increased at about 3 to about 7° C./min. According to another embodiment, the temperature may be increased at about 5° C./min. The temperature may be increased for about 6 to about 10 hours (e.g., until the heat treatment temperature is reached). According to another embodiment, the temperature may be increased for about 8 hours (e.g., until the heat treatment temperature is reached).

Since the description of the positive active material prepared according to the above manufacturing method is the same as the description of the above-described positive active material prepared according to an embodiment of the present invention, it will be omitted herein.

In another embodiment of this disclosure, a rechargeable lithium battery includes a positive electrode, a negative electrode, and an electrolyte. The positive electrode includes a current collector and a positive active material layer disposed on the current collector. The positive active material layer includes the above-described positive active material.

As the description on the positive active material is the same as the above-described embodiment of this disclosure, it will be omitted herein.

The positive active material layer also includes a binder and a conductive material.

The binder improves binding properties of the positive active material particles to one another, and also of the positive active material particles with the current collector. Examples of the binder include at least one selected from polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but the binder is not limited thereto.

The conductive material is included to improve electrode conductivity. Any electrically conductive material may be used as a conductive material unless it causes a chemical change in the battery. Examples of the conductive material include a carbon-based material such as natural graphite, artificial graphite, carbon black, acetylene black, ketjen black, or carbon fiber; a metal powder or a metal fiber including copper, nickel, aluminum, or silver; a conductive polymer such as a polyphenylene derivative; or mixtures thereof.

The negative electrode includes a current collector and a negative active material layer disposed on the current collector. The negative active material layer includes a negative active material.

The negative active material may include a material that can reversibly intercalate/deintercalate lithium ions, a lithium metal, a lithium metal alloy, a material that can be doped and dedoped with lithium, or a transition metal oxide.

The carbon material that can reversibly intercalate/deintercalate lithium ions may include any carbon-based negative active material generally used in a lithium ion secondary battery, for example, crystalline carbon, amorphous carbon, or a combination thereof. The crystalline carbon may include at least one of shapeless graphite, sheet-type graphite, flake-type graphite, spherical-shaped graphite, or fiber-shaped natural graphite, artificial graphite, or a mixture thereof. The amorphous carbon may include soft carbon (carbon fired at a low temperature) or hard carbon, mesophase pitch carbide, fired cokes, or a mixture thereof.

The lithium metal alloy may include a lithium alloyed with a metal selected from Na, K, Rb, Cs, Fr, Be, Mg, Ca, Sr, Si, Sb, Pb, In, Zn, Ba, Ra, Ge, Al, or Sn.

The material that can be doped and dedoped with lithium may include Si, $SiO_x$ (0<x<2), a Si—Y alloy (where Y is not Si and is an element selected from an alkali metal, an alkaline-earth metal, a Group 13 element, a Group 14 element, a transition element, a rare earth element, or a combination thereof), Sn, $SnO_2$, Sn—Y (where Y is not Si and is an element selected from an alkali metal, an alkaline-earth metal, a Group 13 element, a Group 14 element, a transition element, a rare earth element, or a combination thereof), or the like, or a combination thereof. The material that can be dope and dedoped with lithium may also be a mixture of $SiO_2$ and at least one of the other above described materials. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include vanadium oxide, lithium vanadium oxide, or the like.

The negative active material layer may also include a binder, and optionally a conductive material.

The binder plays a role of binding negative active material particles together and also attaching the negative active material to the current collector. Examples of the binder include at least one of polyvinylalcohol, carboxylmethylcellulose, hydroxypropylcellulose, polyvinylchloride, carboxylized polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, or nylon, but the binder is not limited thereto.

The conductive material is included to improve electrode conductivity. Any electrically conductive material may be used as a conductive material unless it causes a chemical change in the battery. Examples of the conductive material include a carbon-based material such as natural graphite, artificial graphite, carbon black, acetylene black, ketjen black, a carbon fiber, or the like; a metal-based material such as a metal powder or a metal fiber including copper, nickel, aluminum, silver, or the like; a conductive polymer such as a polyphenylene derivative; or mixtures thereof.

The current collector may be selected from a copper foil, a nickel foil, a stainless steel foil, a titanium foil, a nickel foam, a copper foam, a polymer substrate coated with a conductive metal, or a combination thereof. The current collector may also include Al. However, the current collector is not limited thereto.

The negative electrode may be fabricated by mixing a negative active material, a conductive material, and a binder in a solvent to prepare an active material composition. The negative active material composition may then be coated on a current collector. The positive electrode may be fabricated by mixing a positive active material, a conductive material, and a binder in a solvent to prepare an active material composition. The positive active material composition may then be coated on a current collector. Methods of manufacturing electrodes are known, and thus they are not described in detail in the present specification. The solvent may include N-methylpyrrolidone, or the like, but the solvent is not limited thereto.

The electrolyte may include a non-aqueous organic solvent and a lithium salt.

The non-aqueous organic solvent plays a role of transferring ions that are related to an electrochemical reaction of a battery. The non-aqueous organic solvent may be carbonate-based, ester-based, ether-based, ketone-based, alcohol-based, or include an aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. Examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, or the like. Examples of the ether-based solvent include dibutyl ether, tetraglyme, diglyme, dimethoxyethane, 2-methyltetrahydrofuran, tetrahydrofuran, or the like. Examples of the ketone-based solvent include cyclohexanone, or the like. Examples of the alcohol-based solvent include ethanol, isopropyl alcohol, and the like. Examples of the nonprotonic solvent include R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, or the like.

The non-aqueous organic solvent may be used singularly or as a mixture. When the organic solvent is used as a mixture, the mixture ratio may be controlled in accordance with selected battery performance.

The carbonate-based solvent may include a mixture of a cyclic carbonate and a linear carbonate. The cyclic carbonate and the chain carbonate are mixed together in a volume ratio of about 1:1 to about 1:9. When the mixture is used as an electrolyte, the electrolyte performance may be enhanced.

In addition, the electrolyte of an embodiment may further include mixtures of carbonate-based solvents and aromatic hydrocarbon-based solvents. The carbonate-based solvents and the aromatic hydrocarbon-based solvents are mixed together in a volume ratio of about 1:1 to about 30:1.

The aromatic hydrocarbon-based organic solvent may be represented by the following Chemical Formula 1.

Chemical Formula 1

In Chemical Formula 1, $R_1$ to $R_6$ are the same or different, and are hydrogen, a halogen, a C1 to C10 alkyl, a C1 to C10 haloalkyl, or a combination thereof.

Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In order to improve a battery cycle-life, the non-aqueous electrolyte may further include vinylene carbonate or an ethylene carbonate-based compound of the following Chemical Formula 2.

Chemical Formula 2

In Chemical Formula 2, $R_7$ and $R_8$ are the same or different, and are independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The use amount of the additive for improving cycle life may be adjusted within an appropriate range.

The lithium salt supplies lithium ions in the battery, and operates a basic operation of a rechargeable lithium battery by improving lithium ion transport between positive and negative electrodes. Non-limiting examples of the lithium salt include at least one salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), $LiCl$, $LiI$, or $LiB(C_2O_4)_2$ (lithium bisoxalate borate, LiBOB). The lithium salt may be used at an about 0.1 to about 2.0M concentration. When the lithium salt is included in the above concentration range, electrolyte performance and lithium ion mobility may be enhanced due to optimal electrolyte conductivity and viscosity.

The rechargeable lithium battery may further include a separator between the negative electrode and the positive electrode, as needed. Non-limiting examples of suitable separator materials include polyethylene, polypropylene, polyvinylidene fluoride, or multi-layers thereof such as a polyethylene/polypropylene double-layered separator, a polyethylene/polypropylene/polyethylene triple-layered separator, or a polypropylene/polyethylene/polypropylene triple-layered separator.

Rechargeable lithium batteries may be classified as lithium ion batteries, lithium ion polymer batteries, or lithium polymer batteries according to the presence of a separator and the kind of electrolyte used in the batteries. The rechargeable lithium batteries may have a variety of shapes and sizes, and may be cylindrical, prismatic, or coin-type batteries, and may be thin film batteries or may be rather bulky in size. Structures and fabrication methods for lithium ion batteries pertaining to this disclosure are known in the art.

Figure 4:
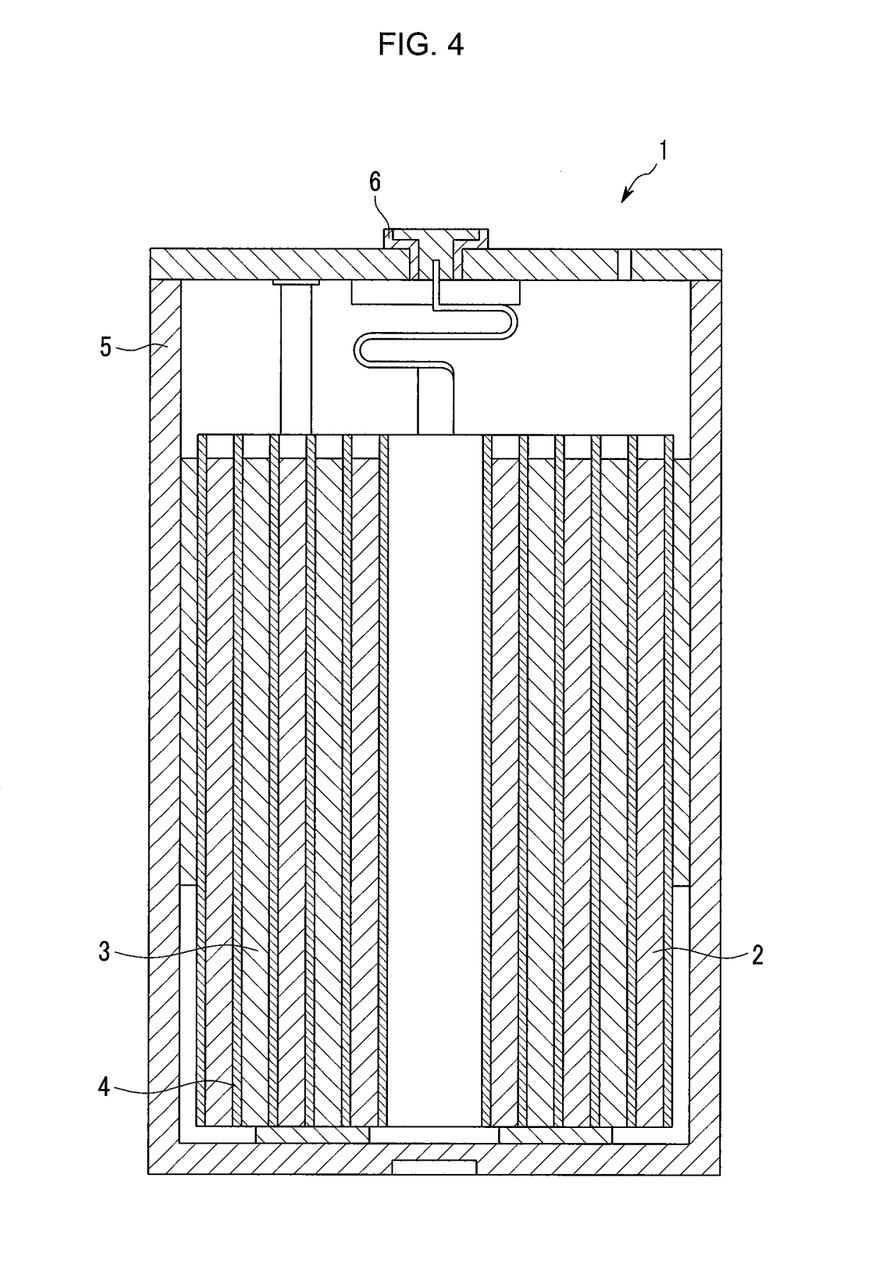
FIG. 4 is a schematic diagram of a rechargeable lithium battery.

FIG. 4 is a schematic diagram of a rechargeable lithium battery. FIG. 4 illustrates a rechargeable lithium battery 1, which includes a positive electrode 3, a negative electrode 2, a battery case 5, an electrolyte solution impregnating a separator 4 that is between the positive electrode 3 and the negative electrode 2, and a sealing member 6 sealing the battery case 5.

The following examples illustrate the present invention in more detail. These examples, however, should not in any sense be interpreted as limiting the scope of the present invention.

EXAMPLES

Preparation of Positive Active Material

Example 1

Preparation of Positive Active Material

A positive active material coated with $Al_2O_3$ was prepared by mixing $LiCoO_2$ positive active material powder with $Al_2O_3$ powder having an average equivalent diameter of about 1.810 μm, raising the temperature up to about 1000° C. at a speed of about 5° C./min, and maintaining the temperature for about 8 hours.

The weight of the $Al_2O_3$ with respect to $LiCoO_2$ positive active material was 0.1 wt %.

Comparative Example 1

Preparation of Positive Active Material $Al_2O_3$ powder was ball-milled using zirconia balls. 7.6 g of nano-sized $Al_2O_3$ powder obtained from the ball milling was precipitated in 200 g of ethanol solvent. Subsequently, $LiCoO_2$ positive active material powder was additionally precipitated in the ethanol solvent, and the surface of the positive active material was coated with $Al_2O_3$ powder by heating the solution up to about 700° C. at a temperature ascending speed of about 1° C./min, and maintaining the temperature of 700° C. for about 2.5 hours.

Comparative Example 2

Preparation of Positive Active Material

A positive active material was prepared according to Comparative Example 1 except that $LiNi_{0.5}Co_{0.2}Mn_{0.3}O_2$ was used instead of $LiCoO_2$ in Comparative Example 1.

Preparation of Half-Cell

Example 2

Preparation of Half-Cell

A positive electrode slurry was prepared by dispersing the positive active material of Example 1, a polyvinylidenefluoride binder, and a carbon conductive agent in an N-methylpyrrolidone solvent at a weight ratio of about 94:3:3. A positive electrode plate was fabricated by coating an aluminum foil with the positive electrode slurry in a thickness of about 40 μm to thereby form a thin electrode plate, drying the thin electrode plate at about 120° C. for about 3 hours or longer, and then rolling the dried thin electrode plate.

A half-cell was fabricated by using the positive electrode plate as a positive electrode and lithium metal as a counter electrode, interposing a polyethylene separator between the positive electrode and the counter electrode, and injecting an electrolyte solution. As for the electrolyte solution, 1.15M $LiPF_6$ EC/EMC/DMC (3/3/4) was used.

Comparative Example 3

Preparation of Half-Cell

A half-cell was fabricated using the same method as Example 2, except for using the positive active material of Comparative Example 1 instead of the positive active material of Example 1.

Experimental Example

Scanning Electron Microscope (SEM)

Figure 5:
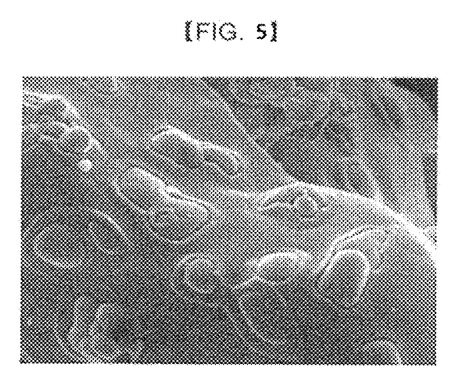
FIG. 5 is a 10000× magnified SEM photograph of a positive active material prepared according to Example 1.

FIG. 5 is a 10000× magnified SEM photograph of a positive active material prepared according to Example 1.

Figure 6:
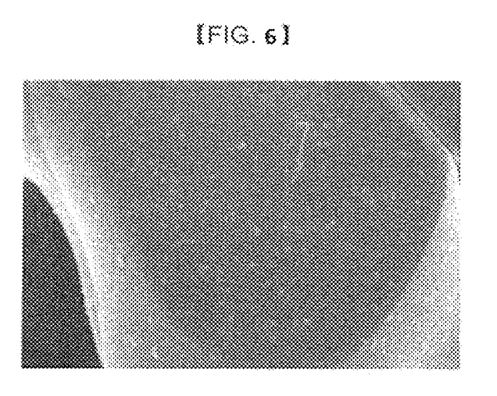
FIG. 6 is a 10000× magnified SEM photograph of a positive active material prepared according to Comparative Example 1.
Figure 7:
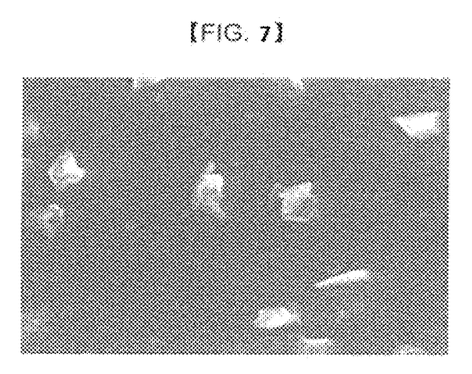
FIG. 7 is a 50000× magnified SEM photograph of a positive active material prepared according to Comparative Example 1.

FIG. 6 is a 10000× magnified SEM photograph of a positive active material prepared according to Comparative Example 1, and FIG. 7 is a 50000× magnified SEM photograph of a positive active material prepared according to Comparative Example 1.

Figure 8:
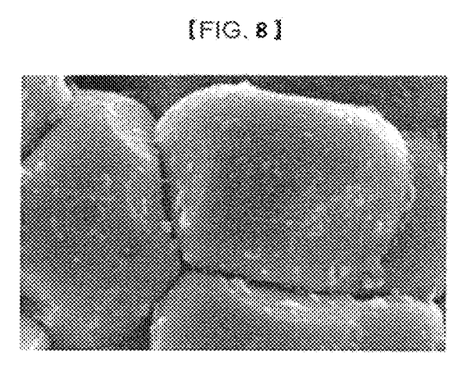
FIG. 8 is a 10000× magnified SEM photograph showing a positive active material prepared according to Comparative Example 2.

FIG. 8 is a 10000× magnified SEM photograph showing a positive active material prepared according to Comparative Example 2.

As FIG. 5 depicts, metal oxide was sufficiently inserted or embedded into the positive active material of Example 1.

In case of the positive active materials of Comparative Examples 1 and 2, the positive active materials were coated with the metal oxide to an extent that the metal oxide adheres to the surface. That is, FIGS. 6 and 7 show that the positive active materials of Comparative Examples 1 and 2 were not inserted or embedded into the positive active material, but rather, adhered to the surface.

Battery Cell Characteristics

The battery cell characteristics of the half-cells prepared according to Example 2 and Comparative Example 3 are shown in the following FIG. 9.

As for the experimental conditions, charge and discharge were performed at about 3.0 to about 4.3 V, and the charge and discharge characteristics were evaluated at 1.0 C for 100 cycles.

Figure 9:
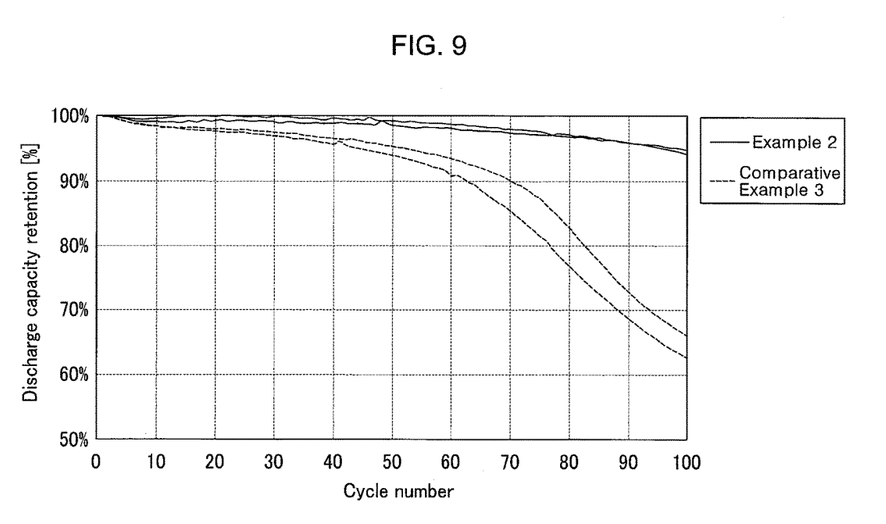
FIG. 9 is a graph depicting battery characteristics of half-cells prepared according to Example 2 and Comparative Example 2.

As FIG. 9 shows, when the discharge capacities of the battery cells after 100 cycles are compared, the capacity of the battery cell of Example 2 was about 90% or more but the capacity of the battery cell of Comparative Example 2 was about 60%. In other words, when a battery cell is fabricated according to Example 1, the cycle-life characteristic of the battery cell is significantly improved.

Measurement of Equivalent Diameter of Metal Oxide

The particle size of the metal oxide of Example 1 before coating was analyzed.

The analysis method used PSA (particle size analysis) equipment (e.g., a Beckman particle size analyzer), and the average equivalent diameter of the particle was about 1.810 μm.

Since the average equivalent diameter after the coating may not be measured other than by using SEM photographs, an average value was acquired by measuring the metal oxide of as many surfaces as possible by using the SEM photographs of the surface of Example 1. For example, the length of a scale bar was applied through an image analysis program (e.g., Image J).

The measured average equivalent diameter was about 1.476 μm.

From the value, the equivalent diameter average of the metal oxide after the coating was about 80% compared with the equivalent diameter average of the metal oxide before the coating. That is, when the particle was assumed to have a spherical shape, about 89.6 volume % of the metal oxide fills the pores on the surface of the positive active material. That is, 89.6 volume % of the metal oxide was below or embedded into the spherical surface of the positive active material.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the above-mentioned embodiments are exemplary but do not limit in any sense.

DESCRIPTION OF SYMBOLS

101: positive active material
102: coating particle
103: protruding portion
104: embedded portion
105: contact portion
d, d' and d": equivalent diameter of metal oxide

The invention claimed is:

1. A positive active material for a rechargeable lithium battery, comprising:
 a particle comprising an active material compound for intercalating and deintercalating lithium; and
 a coating particle having an embedded portion embedded into the active material compound and a protruding portion protruding from a surface of the active material compound,
 wherein the active material compound has a protruding surface that at least partially surrounds a perimeter of the coating particle and protrudes from the surface of the active material compound in a direction substantially perpendicular to the surface of the active material compound,
 wherein the protruding surface is only present adjacent to the coating particle, wherein the volume of the embedded portion is at 80 volume % or 95 volume % or between 80 volume % and 95 volume % of the total volume of the coating particle, and wherein the ratio of an equivalent spherical diameter of the protruding portion to an equivalent spherical diameter of the coating particle is at 0.7 or 0.9 or between 0.7 and 0.9.

2. The positive active material of claim 1, wherein the coating particle has an equivalent spherical diameter at 1.6 or 2.0 μm or between 1.6 and 2.0 μm.

3. The positive active material of claim 1, wherein the coating particle is a compound selected from the group consisting of oxides, hydroxides, oxyhydroxides, oxycarbonates, hydroxycarbonates, and combinations thereof.

4. The positive active material of claim 3, wherein the coating particle further comprises a metal selected from the group consisting of Li, B, C, Na, Mg, Al, Si, P, Ca, Sc, Ti, V, Cr, Mn, Fe, Co, Ni, Cu, Zn, Ga, Ge, As, Sr, Y, Zr, Nb, Mo, Sn, Ba, Hf, La, and combinations thereof.

5. The positive active material of claim 1, wherein the weight of the coating particle with respect to the active material compound is 0.1 to 10 wt%.

6. The positive active material of claim 1, wherein the positive active material is formed by mixing the active material compound and the coating particle to form an active material mixture and heat treating the active material mixture at 85 or 95% or between 85 and 95% of the melting point in ° C. of the active material compound.

7. A rechargeable lithium battery comprising:
a negative electrode comprising a negative active material;
a positive electrode comprising a positive active material, the positive active material comprising a monolithic particle comprising an active material compound for intercalating and deintercalating lithium, and a coating particle having an embedded portion embedded into the active material compound and a protruding portion protruding from a surface of the active material compound; and
an electrolyte,
wherein the active material compound has a protruding surface that at least partially surrounds a perimeter of the coating particle and protrudes from the surface of the active material compound in a direction substantially perpendicular to the surface of the active material compound,
wherein the protruding surface is only present adjacent to the coating particle,
wherein the volume of the embedded portion is at 80 volume % or 95 volume % or between 80 volume % and 95 volume % of the total volume of the coating particle, and wherein the ratio of an equivalent spherical diameter of the protruding portion to an equivalent spherical diameter of the coating particle is at 0.7 or 0.9 or between 0.7 and 0.9.

8. The positive active material of claim 7, wherein the coating particle is a compound selected from the group consisting of oxides, hydroxides, oxyhydroxides, oxycarbonates, hydroxycarbonates, and combinations thereof.

9. The positive active material of claim 8, wherein the coating particle further comprises a metal selected from the group consisting of Li, B, C, Na, Mg, Al, Si, P, Ca, Sc, Ti, V, Cr, Mn, Fe, Co, Ni, Cu, Zn, Ga, Ge, As, Sr, Y, Zr, Nb, Mo, Sn, Ba, Hf, La, and combinations thereof.

10. A method of forming a positive active material for a rechargeable lithium battery, the method comprising:
preparing an active material compound for intercalating and deintercalating lithium;
mixing the active material compound with a coating particle to form an active material mixture; and
heat treating the active material mixture at 85 or 95% or between 85 and 95% of the melting point in ° C. of the active material compound to form the positive active material,
wherein the positive active material comprises a particle comprising the active material compound for intercalating and deintercalating lithium,
wherein the coating particle has an embedded portion embedded into the active material compound and a protruding portion protruding from a surface of the active material compound,
wherein the active material compound has a protruding surface that at least partially surrounds a perimeter of the coating particle and protrudes from the surface of the active material compound in a direction substantially perpendicular to the surface of the active material compound,
wherein the protruding surface is only present adjacent to the coating particle,
wherein the volume of the embedded portion is at 80 volume % or 95 volume % or between 80 volume % and 95 volume % of the total volume of the coating particle, and
wherein the ratio of an equivalent spherical diameter of the protruding portion to an equivalent spherical diameter of the coating particle is at 0.7 or 0.9 or between 0.7 and 0.9.

11. The method of claim 10, wherein the coating particle is a compound selected from the group consisting of oxides, hydroxides, oxyhydroxides, oxycarbonates, hydroxycarbonates, and combinations thereof.

* * * * *